United States Patent
Dymek et al.

(10) Patent No.: US 12,231,889 B2
(45) Date of Patent: Feb. 18, 2025

(54) NETWORK AUTHENTICATION USING MONITORED TRAFFIC ACTIVITY

(71) Applicant: GOGO BUSINESS AVIATION LLC, Broomfield, CO (US)

(72) Inventors: Dana J. Dymek, Vernon Hills, IL (US); Matthew Frank, Chicago, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 525 days.

(21) Appl. No.: 17/491,631

(22) Filed: Oct. 1, 2021

(65) Prior Publication Data
US 2022/0124498 A1 Apr. 21, 2022

Related U.S. Application Data

(60) Provisional application No. 63/093,400, filed on Oct. 19, 2020.

(51) Int. Cl.
| | | |
|---|---|---|
| *H04L 29/06* | (2006.01) | |
| *H04W 12/08* | (2021.01) | |
| *H04W 12/69* | (2021.01) | |
| *H04W 24/08* | (2009.01) | |
| *H04W 24/10* | (2009.01) | |

(52) U.S. Cl.
CPC .......... *H04W 12/08* (2013.01); *H04W 12/69* (2021.01); *H04W 24/08* (2013.01); *H04W 24/10* (2013.01)

(58) Field of Classification Search
CPC ..... H04W 12/08; H04W 12/69; H04W 24/08; H04W 24/10
See application file for complete search history.

(56) References Cited

U.S. PATENT DOCUMENTS

| | | | |
|---|---|---|---|
| 2016/0057145 A1* | 2/2016 | Metral | H04L 63/0807 726/5 |
| 2018/0077030 A1* | 3/2018 | Lauer | H04L 43/16 |
| 2018/0241759 A1 | 8/2018 | Solow et al. | |
| 2020/0244653 A1* | 7/2020 | Eichelberger | H04L 63/1425 |

OTHER PUBLICATIONS

Second Written Opinion, corresponding to International Application No. PCT/US/2021/055521, mailing date Sep. 8, 2022.
International Application No. PCT/US2021/055521, International Search Report and Written Opinion, mailed Jan. 27, 2022.
International Patent Application No. PCT/US2021/055521, International Preliminary Report on Patentability, dated Feb. 2, 2023.

* cited by examiner

*Primary Examiner* — Rodman Alexander Mahmoudi
(74) *Attorney, Agent, or Firm* — MARSHALL, GERSTEIN & BORUN LLP; Randall G. Rueth

(57) ABSTRACT

Systems and methods are provided to re-authenticating an electronic device. The systems and methods (1) receive from an electronic device, a request to access a local access network on-board a vehicle, the request including a device identifier of the electronic device; (2) query, using the device identifier, an access profile assigned to the electronic device to determine that the electronic device has previously been authenticated during a first communication session, wherein the access profile is assigned to the electronic device based upon an indication of a user selection received from the electronic device; (3) monitor network usage associated with the electronic device during a second communication session; and (4) automatically re-authenticate the electronic device based on the monitoring.

20 Claims, 7 Drawing Sheets

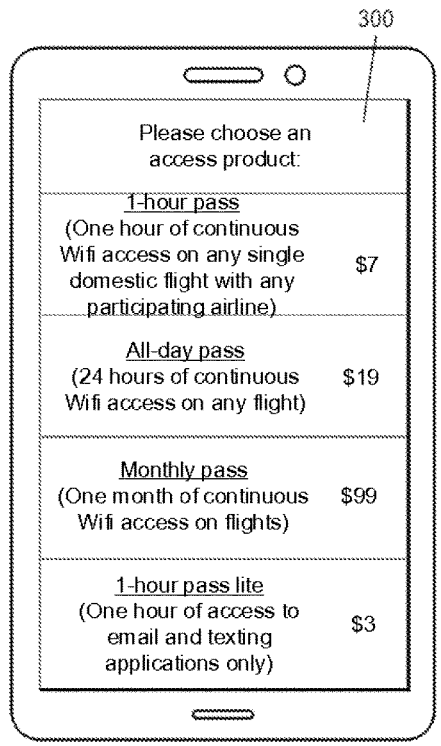

FIG. 3A

Access Profile

- Device identifier (e.g., IMSI, MEID, ICCID, pESN, MAC address, RSSI, browser ID, application usage pattern)
- User identifier (e.g., username, password)
- Purchased access product(s)
- Expiration status

FIG. 3B

Usage Profile

| Application | Amt Used | Time Stamp | Session ID |
|---|---|---|---|
| • Gmail | 9 Mb | 14:00:02 | Session 1 |
| • Facebook | 50 Mb | 14:05:12 | Session 1 |
| • Chrome | 250 Mb | 14:12:56 | Session 1 |
| -www.espn.com | 150 Mb | 14:12:57 | Session1 |
| -www.cnn.com | 100 Mb | 14:15:21 | Session 1 |
| • Instagram | 300 Mb | 14:18:43 | Session 1 |
| • YouTube | 60Mb | 14:21:05 | Session 1 |

FIG. 3C

NETWORK AUTHENTICATION USING MONITORED TRAFFIC ACTIVITY

CROSS-REFERENCE TO RELATED APPLICATIONS

This application claims priority to and the benefit of U.S. Provisional Application No. 63/093,400, filed on Oct. 19, 2020, entitled "Network Authentication Using Monitored Traffic Activity," the entire disclosure of which is hereby expressly incorporated by reference herein.

TECHNICAL FIELD

The following disclosure relates to systems and methods for authenticating electronic devices with a network, and more particularly, for initiating the authentication process without interaction between electronic devices and users thereof.

BACKGROUND

Generally, electronic devices (e.g., mobile phones, tablets, laptops, smart watches, and/or the like) are capable of automatically or manually connecting to a plurality of different wireless networks. Access to these wireless networks is typically regulated by an authentication server, such as an authentication, authorization, and accounting server (an "AAA"). These AAAs may ensure that only authenticated electronic devices are allowed to access the wireless networks. For example, many electronic devices rely on SIM cards to configure the electronic device to communicate over a particular wireless network. If the electronic device contains a SIM card not associated with a service plan on the particular wireless network (i.e., the owner purchased the SIM card without a service plan), the AAA may prevent the electronic device from utilizing the wireless network.

Individuals may carry electronic devices to locations in which the only wireless network is one offered by an operator or service provider other than the one with which an individual has a preexisting relationship. For example, the operator of wireless networks on-board many types of vehicles are not provided by nationwide, terrestrial network operators. In these scenarios, individuals may need access to the on-board wireless networks for limited period of time, such as for the duration of a trip, or for a specified amount of time (e.g., 24 hours, a month, etc.). The individual may purchase an access pass for the desired period of time from the operator of the on-board wireless networks, which the individual may then activate after boarding the vehicle. Thus, authentication for these on-board wireless networks may be negotiated when the individual is located in a vehicle equipped with such an on-board wireless network.

Traditionally, the individual is required to interact with the electronic device (e.g., to create or sign-in into the individual's account using the individual's user identifier or credentials) to authenticate to an on-board wireless network each time the individual begins a new communication session with the on-board wireless network. In a typical scenario, the individual is presented with a sign-in screen on the electronic device to authenticate to the on-board wireless network to start a first communication session. After the first communication session terminates (e.g., due to inactivity, the individual logs out of the individual's account, the individual shuts off the electronic device), the individual is presented with the sign-in screen again to authenticate to the on-board wireless network to start a second communication session, even if the allowed usage period corresponding to the purchased access pass has not expired. Although providing a user identifier or credentials each time the individual attempts to start a new communication session can authenticate the electronic device across multiple communication sessions (thereby confirming that the individual is the same individual across the multiple communication sessions), the conventional approach is also inconvenient for the individual.

Accordingly, there is a need to enable a session initiation process that reduces or eliminates the individual's interaction with the electronic device while maintaining appropriate checks to confirm the identity of the individual.

SUMMARY OF THE DISCLOSURE

The embodiments described herein generally enable an electronic device to be recognized by an on-board wireless network without requiring the individual (i.e., user) to interact with the electronic device (e.g., sign-in into the individual's account using the individual's user identifier or credentials) to re-authenticate to the on-board wireless network when the electronic device has previously been authenticated by the operator of the on-board wireless network. Using at least electronic device identifier(s) received from the electronic device to query an access profile assigned to the electronic device, and analyzing traffic received from the electronic device against an individual's usage profile, as will be further described in detail below, one or more servers can re-authenticate the electronic device to access a local access network in a secure manner. As a result, the electronic device is capable of automatically joining the on-board wireless network, thus seamlessly enabling "no-click" access to the on-board wireless network from the perspective of the individual.

In one embodiment, a method for re-authenticating an electronic device, carried out by one or more servers, is provided. The method may comprise (1) receiving, by one or more processors and from an electronic device, a request to access a local access network on-board a vehicle, the request including a device identifier of the electronic device; (2) querying, by the one or more processors and using the device identifier, an access profile assigned to the electronic device to determine that the electronic device has previously been authenticated during a first communication session, wherein the access profile is assigned to the electronic device based upon an indication of a user selection received from the electronic device; (3) monitoring, by the one or more processors, network usage associated with the electronic device during a second communication session; and (4) automatically re-authenticating, by the one or more processors, the electronic device based on the monitoring.

In another embodiment, a system for re-authenticating an electronic device is provided. The system may comprise (i) one or more processors; (ii) a profile database storing an access profile corresponding to an electronic device; and (iii) one or more non-transitory, computer-readable storage media storing computer-executable instructions that, when executed by the one or more processors, cause the system to (1) receive, from an electronic device, a request to access a local access network on-board a vehicle, the request including a device identifier of the electronic device; (2) query, using the device identifier, the access profile assigned to the electronic device to determine that the electronic device has previously been authenticated during a first communication session, wherein the access profile is assigned to the electronic device based upon an indication of a user selection received from the electronic device; (3) monitor network usage associated with the electronic device during a second communication session; and (4) automatically re-authenticate the electronic device based on the monitoring.

BRIEF DESCRIPTION OF THE DRAWINGS

FIG. 3A is an exemplary interface displayed on an electronic device, such as one of the electronic devices 110 of FIG. 1, associated with the user purchase of an access product;

FIG. 3B is an exemplary access profile corresponding to an electronic device, such as one of the electronic devices 110 of FIG. 1;

FIG. 3C is an exemplary usage profile corresponding to an electronic device, such as one of the electronic devices 110 of FIG. 1;

DETAILED DESCRIPTION

Figure 1:
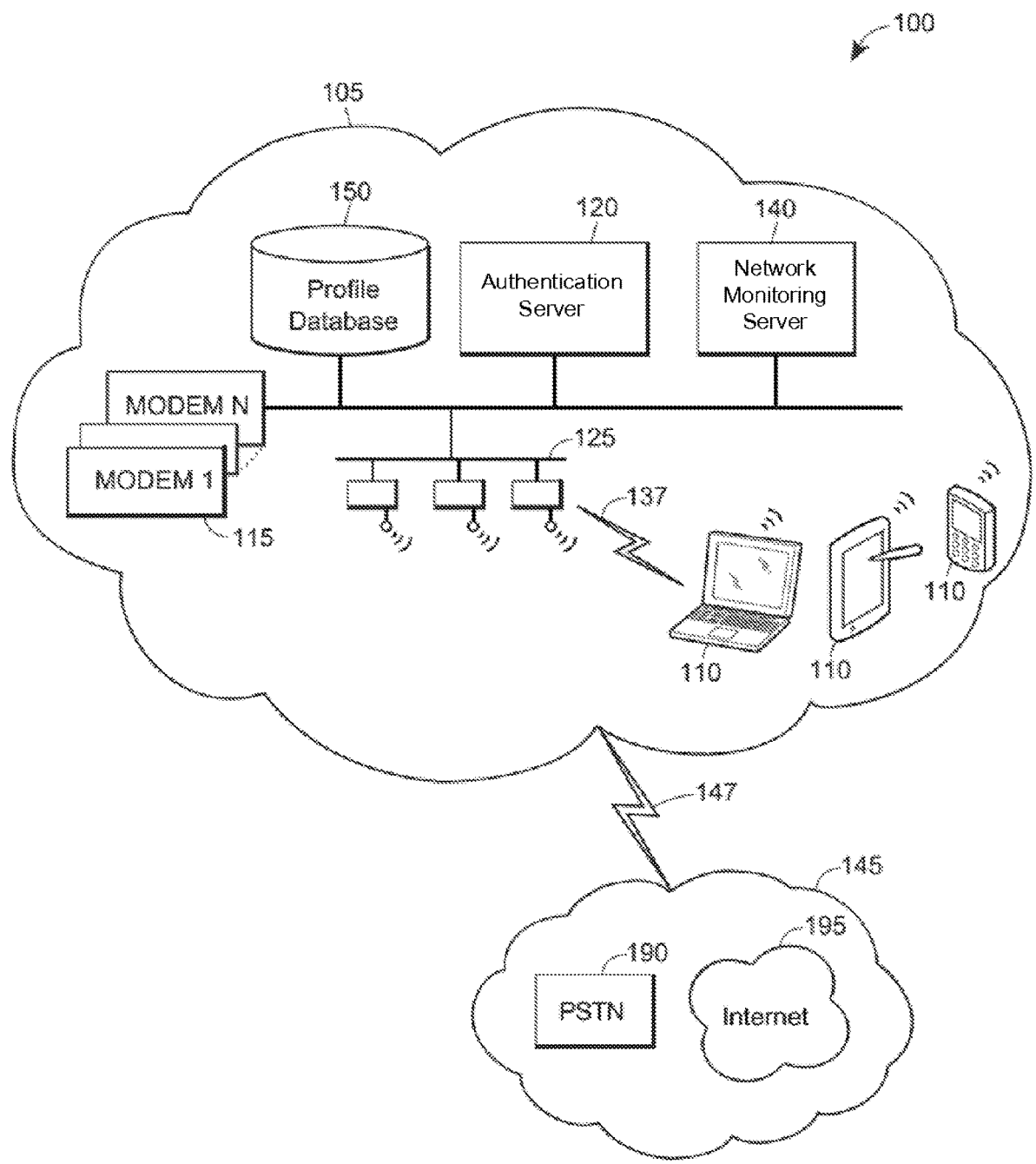
FIG. 1 depicts an embodiment of an exemplary communication system capable of performing one or more of the re-authentication techniques disclosed herein.

It should be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Traditionally, when an electronic device attempts to register with any wireless network, the electronic device transmits a registration message. For example, a mobile phone may automatically attempt to register with a Wi-Fi network with which the mobile phone has previously registered. The registration message may identify the electronic device and/or provide a passkey or other authentication credential required to access the wireless network. In response, an authentication, authorization, and accounting server (a "AAA") or other authentication entity may compare the identity and authentication credential to a database to determine whether the electronic device should be granted access to the wireless network. If the electronic device is authenticated, the electronic device is assigned an address at which it is reachable over the wireless network, thus providing access to the wireless network.

Upon the AAA authenticating the electronic device to utilize the wireless network, the electronic device and the AAA may negotiate a feature set associated with the network access. As part of this negotiating process, both the electronic device and the wireless network may each be associated a set of supported features. For any overlapping features between the two sets of supported features, the AAA may attempt to register the electronic device to utilize each overlapping feature. For certain features, this may involve the AAA forwarding information contained within the original registration message to a server associated the specific feature to determine whether to grant access to the specific feature. In one embodiment, these servers corresponding to network features may maintain a registry of all devices authenticated to utilize the corresponding features, as well as any configuration parameters associated therewith.

However, these traditional approaches may not be optimal for wireless networks that are typically used for fixed intervals and/or on a one-off basis, such as a wireless network associated with a vehicle (an "on-board wireless network"). To this end, access to on-board wireless networks and/or features thereon may preferably be negotiated at the time of use rather than in advance as determined by a pre-purchased service plan.

Conventionally, access to on-board wireless networks is instead initially authenticated through an individual's interactions with the electronic device, such as via a captive portal (i.e., a landing, re-direct, or capture webpage for negotiating network access). In an example scenario, when an electronic device automatically attempts to register with an on-board wireless network, a corresponding AAA assigns the electronic device a default access profile restricting external communications. When a user of an electronic device actively attempts to access the on-board wireless network equipped in a vehicle, the AAA causes the captive portal to be displayed on the electronic device. The captive portal may enable the individual to provide a user identifier or credentials (e.g., name, password) to create an account, purchase network (and/or feature) access for a limited period of time, and/or agree to terms of use. Generally, to facilitate the presentation of a captive portal user interface on the electronic device, the AAA may generate a set of computer readable instructions that, when executed by the electronic device, cause the electronic device to present the captive portal user interface to the user of the electronic device. In some embodiments, the captive portal user interface may be presented in other ways, such as a web page presented in a browser application executing on the electronic device. In these embodiments, in response to the browser navigating to a particular address associated with the presentation of the captive portal user interface, the AAA may transmit the computer readable instructions to the electronic device. Accordingly, the computer readable instructions may include an HTML resource, a JavaScript applet, a Cascading Style Sheets component, and/or other known software elements that support the presentation of the captive portal user interface over an on-board wireless network.

In other embodiments, the captive portal user interface may be presented within an application executing on the electronic device. In these embodiments, the computer readable instructions may include an instruction that causes an application stored on the electronic to launch. For example, the network operator may distribute an application for enabling users to manage their network experience and/or configuration via an app store or as a hosted download. In some scenarios, the app may already include instructions to display a captive portal user interface. However, in these scenarios, the app may still need to communicate with the AAA to access the on-board wireless network.

Upon completing the required interactions with the captive portal, the AAA may authenticate the electronic device access, for a limited period of time, to any of the on-board wireless networks managed by the operator of the AAA, including the on-board wireless network equipped in the vehicle, and any purchased features thereof by changing the default access profile associated with the electronic device in accordance with the individual's interactions with the captive portal. Accordingly, the electronic device may be authenticated to begin a first communication session with the AAA.

However, after the first communication session terminates (e.g., due to inactivity, the individual logs out of the individual's account, the individual shuts off the electronic device), if the individual desires to begin a second communication session within the limited period of time to access the on-board wireless network, the individual is required to again interact with the electronic device to re-authenticate to the on-board wireless network. Many individuals are deterred by repeatedly being required to access the captive portal solution for instance, finding it to be too cumbersome to complete.

Conventional authentication technologies are primarily based on authenticating an electronic device by comparing its Media Access Control (MAC) address to a list of pre-authorized MAC addresses. However, simply obtaining the MAC address to bypass the captive portal to re-authenticate the electronic device is a vulnerable approach, as unauthorized electronic devices on-board the vehicle may be able to perform various MAC spoofing or cloning techniques for changing its factory-assigned MAC addresses to pre-authorized MAC addresses to surreptitiously gain access to the on-board wireless network. In this way, the on-board wireless network can be disrupted by a spoof attack, where even a single malicious robot can spoof a large number of electronic devices, for example. Thus, not only does the operator of the on-board wireless network lose revenue from potential customers, but, due to many electronic devices being configured to improperly join its on-board wireless networks, these electronic devices may successfully connect to the on-board wireless networks. Because these on-board wireless networks may have limited available bandwidth, these successful connections may negatively impact the network performance for electronic devices properly authenticated onto the on-board wireless network.

To solve this problem, the AAA may monitor network usage (e.g., using heuristic or statistical techniques) associated with the electronic device communicating over the network during the second communication session, and if the network usage satisfies a certain metric, re-authenticate the electronic device. To this end, a user of the electronic device may interact with a plurality of different applications and/or websites via the network. Accordingly, the AAA may monitor communications between the electronic device and each of these applications and/or websites. If the AAA determines that the network usage during the second communication session satisfies a metric associated with network usage during the first communication, the AAA may automatically re-authenticate the electronic device. For example, if the AAA is heuristically configured to determine whether the same set of applications and/or websites are utilizing a proportionate amount of network resources in the second communication session as was utilized in the first communication session, the AAA may determine whether the same individual is utilizing the electronic device, as individuals each have a tendency to habitually use the same set of applications and/or websites over a period of time. Upon determining that the same individual is utilizing the electronic device, the AAA can automatically re-authenticate the electronic device. Otherwise, if the AAA identifies disproportionate discrepancies in network usage between the first communication session and the second communication session for example, the AAA may provide a notification to the electronic device requesting the individual to manually re-authenticate the electronic device (e.g., via the captive portal), and/or to verify that the individual is human.

Although the AAA is described above as performing functionalities related to authenticating the electronic device, monitoring network usage, and generating user interfaces, it is envisioned that these functionalities may be divided across multiple servers (including a network monitoring server, as further described herein). Accordingly, a single server or any collection of distributively configured servers or other similar hardware configurations can perform the network usage-based authentication capabilities disclosed herein.

FIG. 1 depicts an embodiment of an exemplary environment 100 capable of performing the network usage-based authentication capabilities as described herein. The environment 100 may include a local access network 105 and an external network 145. Although FIG. 1 depicts only a single local access network 105, in some embodiments a network operator may implement a plurality of local access networks 105. For example, a network operator may implement a local access network 105 within each of a plurality of vehicles (such as airplanes, trains, boats, cars, and so on). The environment 100 may be associated with at least two communication links; a local communication link 137 to provide connectivity to electronic devices 110 while the electronic devices 110 are disposed within the local access network 105, and an external communication link 147 between the local access network 105 and an external network 145 connected to a public switched telephone network (PSTN) 190 and/or the Internet 195. Although the external communication link 147 is depicted as a singular communication link, the external communication link 147 may comprise a plurality of individual communication links. For example, the communication link 147 may include any combination of an Air-to-Ground communication link, a satellite communication link, an Ethernet communication link, and/or any other communicated link.

To this end, the communication system may contain one or more modems 115 configured to be compatible with a plurality of different communication standards utilized by the local communication link 137 and the external communication link 147. For example, the local communication link 137 and the external communication link 147 may utilize communication protocols associated with terrestrial communications (e.g., TDMA, GSM, CDMA, GSM, LTE, WiMAX, Wi-Fi, Ethernet, etc.) and/or associated with frequencies in the $K_a$ band, the $K_u$ band, the L band, and/or any other suitable wireless communication frequency bands. Each of the plurality of modems 115 may be connected to a transmitter (not depicted) for transmitting and receiving communications from the external network. In embodiments where the external communication link 147 is a wireless communication link, the transmitter includes one or more antennas. In embodiments where the external communication link 147 is a wired communication link, the transmitter may include an Ethernet transmitter.

Generally speaking, the electronic devices 110 may send and receive data over the local communication link 137 via access points 125. The electronic devices 110 may include any mobile computing device, such as a smartphone, a tablet, a laptop computer, a personal digital assistant, an e-reader, smart glasses, smart watches, or any other mobile computing device capable of wireless communications.

The environment 100 may also include an authentication server 120 (e.g., an AAA) to control access to the local communication link 137 and/or the external communication link 147. To this end, the authentication server 120 may interpret a set of non-transitory, computer-readable instructions to perform the network usage-based authentication techniques described herein. As part of the network usage-based authentication techniques, the authentication server 120 may interact with a profile database 150 to assign, update, and/or maintain an access profile storing parameters associated with particular levels of network access for each of the electronic devices 110. In some scenarios, after the electronic devices 110 register with the authentication server 120, the authentication server 120 may query the profile database 150. If there are access profiles in the profile database 150 corresponding to the electronic devices 110, then the authentication server 120 may assign the electronic devices 110 the stored access profiles. Conversely, if there is not currently an access profile associated with the electronic devices 110, the authentication server 120 may assign a default access profile to the electronic devices 110. The authentication server 120 may be further configured to monitor the local communication link 137 to detect any indications transmitted from the electronic devices 110 that a user of the electronic devices 110 wishes to change a corresponding access profile. In response, the authentication server 120 may interact with the profile database 150 to update the corresponding access profile with the indicated changes.

In addition to storing access profiles, the profile database 150 may also store a usage profile corresponding to each of the electronic devices 110. The usage profile may include historical records that indicate with which applications and/or websites the electronic device 110 communicated. In particular, the usage profile may list any application, website, or port (e.g., port 80) with which the electronic device 110 communicated, when the communications occurred, an amount of data (i.e., payload) communicated, and/or an usage pattern that indicates the order in which the individual accessed certain applications (e.g., the individual first accessed Facebook, followed by Instagram, followed by YouTube) or websites. In some embodiments, individual applications or websites may be assigned a category (such as entertainment, news, sports, music, video, and so on). Accordingly, the usage profile may also store historical records at a category level, as well as at an application or website level.

Although FIG. 1 depicts the profile database 150 interconnected with the authentication server 120, in some embodiments, the profile database 150 may actually be a component of the authentication server 120. Furthermore, although FIG. 1 depicts the profile database 150 within the local access network 105, it should be appreciated that the profile database 150 may additionally or alternatively be located outside of the local access network 105, such as at a location accessible via the external network 145. For example, in some embodiments, a network operator may implement a centralized profile database (not depicted) which maintains a master database of all user access profiles and/or all user usage profiles. In these embodiments, each local database 150 located within the local access network 105 may be periodically synchronized with the centralized profile database. In these embodiments, any changes made to an access profile or usage profile stored by the profile database 150 within the local access network 105 are propagated to the centralized profile database, then to every other profile database 150 located in each other local access network 105. As a result, the electronic devices 110 may be associated with the same access profiles or usage profiles as the electronic devices are carried within any local access network 105 operated by the network operator.

The local access network 105 may also include a network monitoring server 140 for controlling and monitoring data communicated over the local communication link 137 and/or the external communication link 147. Any data generated by the electronic devices 110 within the local access network 105 may be routed to the network monitoring server 140 prior to transmission over the external communication link 147. If the network monitoring server 140 determines that data should be transmitted over the external communication link 147, network monitoring server 140 may route the data to the plurality of modems 115 which forward and/or transmit this data to the external network 145 via the external communication link 147 for routing to the addressed location via, for example, the PSTN 190 or the Internet 195. As part of this determination, the network monitoring server 140 may query the profile database 150 to retrieve an access profile associated with the electronic devices 110. To this end, the network monitoring server 140 may identify a particular electronic device 110 by analyzing the header of a data packet routed to the network monitoring server 140. The network monitoring server 140 may then retrieve the access profile stored in the profile database 150 corresponding to the particular electronic device 110. The network monitoring server 140 may then process the data packet in accordance with the access profile. Depending on the particular parameters stored in the retrieved access profile, the network monitoring server 140 may block the data packet over the external communication link 147, delay the transmission of the data packet, transmit the data packet over the external communication link 147, and/or perform any other data control.

As an example, the access profile may indicate that the individual purchased a 24 hour access pass, and that the allowed usage period corresponding to the purchased access pass has not expired. The network monitoring server 150 may then transmit the data packet to the external network 145 via the external communication link 147. As another example, the access profile may indicate that the individual purchased an access pass that permits usage of certain applications (e.g., applications for checking email, text messaging) but blocks other types of data intensive applications (e.g., social media applications, applications for streaming video). The network monitoring server 150 may determine whether a data packet corresponds to a certain type or category of applications, by analyzing a destination address and comparing the destination address to a list of known host destinations, or by analyzing whether the data packet exhibits certain characteristics (e.g., contains video data, text data). The network monitoring server 150 may transmit data packets corresponding to less data intensive applications to the external network 145 via the external communication link 147.

The network monitoring server 140 may monitor the data packets received over the local communication link 137 and/or the external communication link 147 by tracking the types or categories of applications, websites, or ports corresponding to the data packets, determining an amount of data packets (i.e., payload) utilized by each application, website, port, and/or category, and/or determining a usage pattern that indicates the order in which the individual accessed certain applications or websites. The network monitoring server 140 may then compare the network usage resulting from the monitoring with the usage profile corresponding to the electronic devices 110. If the network usage satisfies a certain metric with respect to the usage profile, the network monitoring server 140 may continue transmitting data packets to the external network 145 via the external communication link 147. Otherwise, if the network usage does not satisfy the metric with respect to the usage profile, the network monitoring server 140 may provide a notification to the electronic device 110, causing the electronic device 110 to display a notification to the individual to re-authenticate the electronic device 110, and/or to verify that the individual is human. In some embodiments, the network monitoring server 140 may provide the notification to the authentication server 120, which in turn provides the notification to the electronic device 110.

Figure 2:
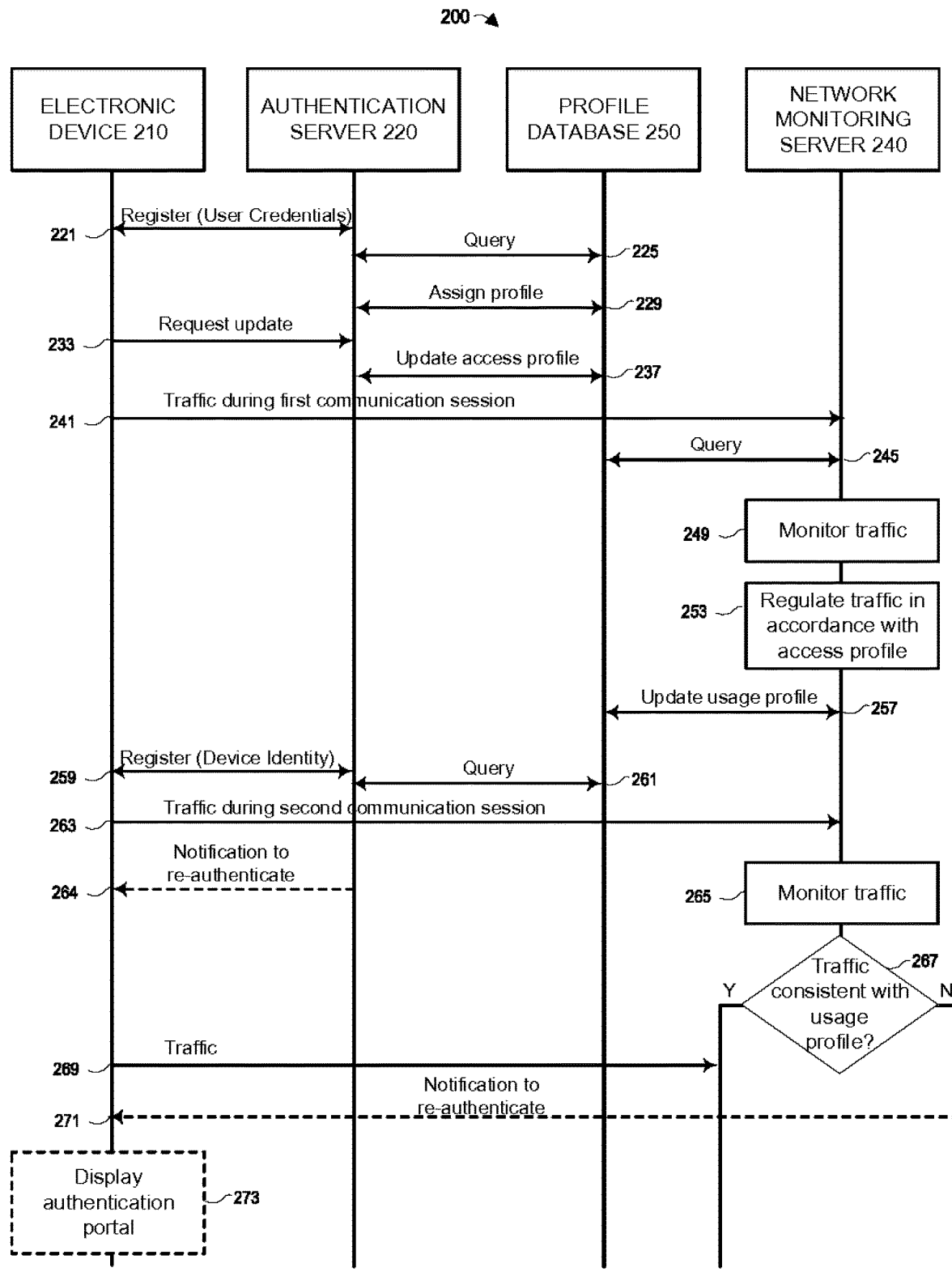
FIG. 2 illustrates an example signal diagram in which an authentication server (e.g., the authentication server 120 of FIG. 1) and a network monitoring server (e.g., the network monitoring server 140 of FIG. 1) re-authenticate an electronic device (e.g., one of the electronic devices 110 of FIG. 1)

Turning to FIG. 2, illustrated is an example signal diagram 200 in which a network monitoring server 240, such as the network monitoring server 140, controls and monitors traffic originated by an electronic device 210, such as one of the electronic devices 110. The network monitoring server may be interconnected with a profile database 250, such as the profile database 150.

The signal diagram 200 may begin when the electronic device 210 communicates with an authentication server 220, such as the authentication server 120, to register (221) with a local access network (not depicted), such as the local access network 105. As part of the registration process, a user of the electronic device 210 may transmit a user identifier or credentials to the authentication server 220. For example, the user, via the electronic device 210, may transmit a user identifier, such as a username (e.g., email address, user ID, and so on) and password (e.g., a WEP password, a WPA password, and so on), and/or a response to a challenge (e.g., a CAPTCHA response, an answer to a simple math problem, etc.) indicating that the user of the device is human. Upon the authentication server 220 determining that the electronic device 210 transmitted the correct user identifier or credentials, the authentication server 220 may authenticate the electronic device 210 to communicate over the local access network.

According to aspects, to authenticate the electronic device 210, the authentication server 220 may query (225) the profile database 250 to assign the electronic device 210 an access profile. To this end, the authentication server 220 may utilize the user identifier or credentials to search for a record in the profile database 250 that corresponds to the electronic device 210. For example, the electronic device 210 may have been utilized within a local access network operated by the same (or affiliated) network operator as the current local access network. Accordingly, the profile database 250 may already store a record corresponding to the electronic device 210 indicating any access products that the user of the electronic device 210 may have purchased (e.g., the electronic device 210 is associated with a multi-use access package). The record may also include a device identifier, such as an international mobile subscriber identity (IMSI), mobile equipment identifier (MEID), integrated circuit card identifier (ICCID), pseudo electronic serial number (pESN), or a media access control (MAC) address of the electronic device 210. The device identifier need not be predetermined by a manufacturer or provisioned in a SIM card. For example, the device identifier may be or otherwise be associated with the strength of a wireless signal (e.g., received signal strength indicator (RSSI)) from an access point (such as the access point 125) within the local access network as measured by the electronic device 210, an identifier of a browser application (i.e., a browser ID) that is launched by the individual to attempt to connect to the local access network, a destination unified resource locator (URL), a service set identifier (SSID), and/or even data (e.g., flight data) related to the vehicle in which the local access network is located. In scenarios in which the electronic device 210 does not correspond to an access profile within the profile database 250, the profile database 250 may store a default and/or basic access profile for use with new electronic devices. In these scenarios, the authentication server 220 may create a new record within the profile database 250 based upon the default and/or basic access profile corresponding to the electronic device 210.

According to aspects, the authentication server 220 may then assign (229) the electronic device 210 the appropriate access profile (i.e., the corresponding stored access profile or the default access profile). In order to actually assign the access profile to the electronic device 210, the authentication server 220 may generate and assign the electronic device 210 an IP address on the local access network. The authentication server 220 may then store the assigned IP address in the profile database 250 in an electronic record that corresponds to the electronic device 210. It should be appreciated that the IP address field in the profile database record may be NULL or a specific value that indicates an unassigned IP address whenever the electronic device 210 is not authenticated with a local access network.

At some point after the initial assignment of the access profile, the authentication server 220 may detect that the electronic device 210 is requesting (233) an update to the corresponding access profile. The request may be transmitted in response to the user of the electronic device 210 purchasing an access product upon an initial registration (e.g., when the user purchases an access product, such as, for example, via a captive portal presented upon initial use of the local access network). If the request is in response to the purchase of an access product, the request may identify the access product purchased (such as by use of a product code number). The authentication server 220 may then correlate the identification to a set of access parameters associated with the purchased access product. In any event, the authentication server 220 may determine a set of changes to make to the access profile in the profile database 250 which corresponds to the electronic device 210. The authentication server 220 may then update (237) the corresponding electronic record in the profile database 250 in accordance with the determined set of changes. Although the signal diagram 200 depicts the authentication server 220 receiving the update and updating the access profile, it is envisioned that the network monitoring server 240 may additionally or alternatively perform these steps.

After the access profile is updated, the electronic device 210 may transmit (241) a plurality of data packets (i.e., traffic) over the local access network during a first communication session. The traffic may be routed to the network monitoring server 240 for processing prior to transmission to an external network. In response, the network monitoring server 240 may extract an IP address from the header of the individual data packets. The network monitoring server 240 may then use the extracted IP address to query (245) the profile database 250 in order to identify the access parameters stored in the access profile corresponding to the electronic device 210 to confirm that the electronic device 210 is authenticated to transmit the traffic over the local access network and to the external network.

The network monitoring server 240 may also monitor (249) the traffic transmitted by the electronic device 210. The monitoring may begin by identifying the first communication session in which the electronic device 210 is currently engaged. In many scenarios, the electronic device 210 may communicate with a one or more different applications sequentially, or simultaneously during the first communication session. For example, the electronic device 210 may communicate with a social media application (e.g., Facebook), stop communicating with the social media application, and communicate with another social media application (e.g., Twitter) during the first communication session. As another example, the electronic device 210 may communicate with a social media application (e.g., Facebook), and while the electronic device 210 is communicating with the social media application, communicate with another social media application (e.g., Twitter) during the first communication session. In this way, the network monitoring server 240 may identify that the traffic currently supports one or more applications, websites, or ports in the first communication session, separate the traffic into individual data streams corresponding to each application, website, or port, and further correspond the data stream to an application, website, port, and/or category. As an example, the first communication session may correspond to an application through analysis of a destination address indicated by the header of a data packet. The network monitoring server 240 may be associated with a reference table that maps popular destination addresses and/or strings within a fully qualified domain name (FQDN) to an application, website, and/or an application or website category. Accordingly, the network monitoring server 240 may separate the traffic into individual applications in the first communication session based upon the destination address and then, utilizing the destination address, query the reference table to identify application(s) supported in the first communication session within the traffic. In some embodiments, the network monitoring server 240 may also further categorize each application as belonging to a category of applications.

In some embodiments, when the network monitoring server 240 determines that the electronic device 210 is communicating with an application in a secured first communication session (e.g., VPN session), the network monitoring server 240 may analyze a plurality of characteristics of the data stream to determine a probable application category for the first communication session within the first secured communication session. For example, VOIP calls and/or streaming video may be associated with a particular set of transmission characteristics. Accordingly, the network monitoring server 240 may compare measured transmission characteristics of the data stream addressed to the secured server (e.g., VPN server) to known sets of transmission characteristics indicative of particular types of applications and/or application categories. As a result of this comparison, the network monitoring server 240 may be able to identify an application and/or application category corresponding to the secured first communication session.

After the network monitoring server 240 has identified the application(s), website(s), port(s), and/or website or application category utilized during the first communication session and/or data streams within the received traffic, the network monitoring server 240, in some embodiments, may regulate (253) the traffic in accordance with the access profile corresponding to the electronic device 210. To this end, the network monitoring server 240 may compare each application, website, port, and/or website or application category associated with a data stream to the queried access profile to regulate each data stream. For example, if the individual purchased a "lite" access pass in which the individual is allowed to use certain applications (e.g., email applications) but not allowed to use other types of applications (e.g., video streaming applications), the access profile may indicate that video traffic should be blocked but email traffic should be allowed. In this example, if the electronic device 210 transmits both video and email data, the network monitoring server 240 may block the video data from being transmitted to an external network, whereas the network monitoring server 240 may route the email data over an external communication link to respectively corresponding destination addresses.

The network monitoring server 240 may then determine an initial usage behavior-based metric that is unique to the user of the electronic device 210 based on the traffic in the first communication session. More particularly, the network monitoring server 240 may track and/or maintain network usage (e.g., using heuristic or statistical techniques) associated with any traffic transmitted and received by the electronic device 210. The network monitoring server 240 may analyze network usage regarding the names of applications used, the types or categories of applications used, port numbers, websites requested, a payload (e.g., measured byte volume) of the data packets corresponding to a particular website, application, and/or category, usage pattern (e.g., the order in which the electronic device accessed a website, application, or port according to respective timestamps captured by the network monitoring server 240), and/or any other relevant statistics that characterize the traffic transmitted and received by the electronic device 210. The network monitoring server 240 may calculate a usage behavior-based metric based on a statistical analysis of the network usage. For example, the usage behavior-based metric may correspond to a total number of applications, ports, and/or websites accessed by the electronic device 210, an average or total payload of the total number of applications, ports, and/or websites, the most frequently accessed application, port, and/or website, etc. It should be appreciated that other statistical approaches of characterizing the traffic transmitted and received by the electronic device 210 in a usage behavior-based metric are contemplated.

In some embodiments, the network monitoring server 240 may continue to identify and/or categorize additional traffic in the first communication session to adjust the initial usage behavior-based metric in accordance with the additional traffic. The network monitoring server 240 may determine a threshold time period during which to continue identifying and/or categorizing additional traffic, and upon expiration of the threshold time period, halt the adjustment and calculate the latest usage behavior-based metric.

After determining the usage behavior-based metric, the network monitoring server 240 may also update (257) a usage profile within the profile database 250 that corresponds to the electronic device 210 to include or otherwise be associated with the usage behavior-based metric. Accordingly, it should be appreciated that the usage profiles stored by the profile database 250 may correspond to the metrics maintained by the network monitoring server 240, and that the network monitoring server 240 may utilize the maintained metrics to update the corresponding metrics stored within the usage profile to ensure that the stored usage profile accurately indicates the traffic transmitted and received by the electronic device 210. As the usage profile is unique to the individual, the usage profile may effectively be used, as a substitute to the user identifier or credentials of the individual, to identify the individual or electronic device 210 when re-authenticating the electronic device 210, as further discussed below.

Before the expiration of an allowed usage period (e.g., corresponding to an access product purchased) during which the electronic device 210 has been authenticated by the authentication server 220 to use the local access network 105 and, in some embodiments, the external network 145, the electronic device 210 may terminate the first communication session. For example, the electronic device 210 may terminate the first communication session when the individual of the electronic device 210 shuts off the electronic device 210, logs out of the individual's account associated with the first communication session, or when the network monitoring server 240 detects traffic inactivity for a predetermined time period.

Later (e.g., when the individual desires to begin a second communication session on the same or different local access network 105), the electronic device 210 may attempt to access the local access network 105 and, in some embodiments, the external network 145 before the expiration of the allowed usage period. Rather than requiring the individual to provide a user identifier or credentials (e.g., a username and password, and/or an indication that the user of the device is human as discussed above) via the electronic device 210 to re-authenticate the electronic device 210, the authentication server 220 can re-authenticate the electronic device 210 by receiving the device identifier (e.g., IMSI, MEID, ICCID, pESN, MAC address, RSSI, browser ID, or destination URL as discussed above) of the electronic device 210 when the electronic device 210 communicates with the authentication server 220 to register (259) with the local access network 105. Because the profile database 250 already stores a record indicating the device identifier of the electronic device 210 as a result of establishing the first communication session, as well as any unexpired access products that the individual of the electronic device 210 may have purchased, the authentication server 220 may re-authenticate the electronic device 210 after querying (261) the profile database 250. As a result, the electronic device 210 may be re-authenticated to transmit (263) data packets over the local access network 105, and in some embodiments, the external network 145, during the second communication session.

In some embodiments, the record stored in the profile database 250 may indicate that the electronic device 210 belongs to the individual (e.g., the record indicates that a device identifier is associated to the user identifier). Upon receiving (259) the device identifier and querying (261) the profile database 250 using the device identifier, the authentication server 220 may obtain the user identifier associated with the device identifier and subsequently determine whether any record (e.g., stored in the profile database 250, or other entity database) indicating that the individual likely boarded the vehicle exists. For example, if the vehicle is an airplane, the authentication server 220 may access flight manifest data (e.g., flight number, origin and destination (O&D) flight information), flight route, ticketing data), or otherwise communicate with another entity that has access to the flight manifest data, to check whether the individual purchased a ticket to board the airplane in which the local access network 105 is located. The authentication server 220 may re-authenticate the electronic device 210 after determining that a record that indicates that the individual likely boarded the vehicle exists. If the authentication server 220 does not determine that such a record exists, the authentication server 220 may send (264) a notification to the electronic device 210 to re-authenticate the electronic device 210, causing the electronic device 210 to display an authentication portal for receiving a user identifier from the individual. To this end, the authentication server 220 may prevent unauthorized electronic device from accessing the local access network by spoofing an electronic device that has already successfully registered with the local access network 105.

As shown in FIG. 2, the data packets can be routed to the network monitoring server 240 for processing prior to transmission to an external network. In this way, the network monitoring server 240 can continue to monitor (265) the traffic transmitted by the electronic device 210 during the second communication session. The network monitoring server 240 may compare (267) the traffic to the usage profile that corresponds to the electronic device 210. For example, the network monitoring server 240 may analyze the traffic to calculate a session metric that represents statistics for applications, ports, and/or websites accessed by the electronic device 210 during the second communication session. The session metric may be calculated in a similar manner as the usage behavior-based metric described above. As part of the comparison, the network monitoring server 240 may determine whether the session metric is within a certain threshold of a usage behavior-based metric associated to the usage profile.

In one embodiment, to perform the comparison, the network monitoring server 240 may first analyze destination address(es) indicated in header(s) of data packets received from the electronic device 210 to identify the application(s) and/or website(s) with which the electronic device 210 communicated during the second communication session. The network monitoring server 240 may then calculate a session metric corresponding to the identified application(s) and/or website(s), and compare the session metric to the usage behavior-based metric associated with the usage profile. If the session metric is within a certain heuristically defined threshold of the usage behavior-based metric, the network monitoring server 240 may determine that the traffic received from the electronic device 210 during the second communication session satisfies (or is consistent with) the usage behavior-based metric. For example, if the threshold is defined to be one application, a session metric corresponding to three applications can be within the threshold of a usage behavior-based metric corresponding to four applications.

In another embodiment, to perform the comparison, the network monitoring server 240 may determine the payload (e.g., byte volume) of traffic for each application and/or website with which the electronic device 210 communicated during the second communication session. The network monitoring server 240 may then calculate a session metric corresponding to the payload of traffic for each application and/or website, and compare the session metric to the usage behavior-based metric associated with the usage profile. If the session metric is within a certain heuristically defined threshold of the usage behavior-based metric, the network monitoring server 240 may determine that the traffic received from the electronic device 210 during the second communication session satisfies (or is consistent with) the usage behavior-based metric. For example, if the threshold is defined to be 100 megabytes, a session metric corresponding to a total payload of 650 megabytes is not within the threshold of a usage behavior-based metric corresponding to a total payload of 450 megabytes.

By comparing the traffic during the second communication session with the usage profile, the network monitoring server 240 is capable of re-authenticating the electronic device 210 if the traffic, as characterized by the session metric, is consistent with the usage profile. Because the usage profile is unique to the individual and may be used to identify the individual or electronic device 210, the network monitoring server 240 may in effect confirm that the individual of the electronic device 210 during the second communication session is the same individual of the electronic device 210 during the first communication session.

If the network monitoring server 240 determines that the traffic is consistent with the usage profile, the network monitoring server 240 may re-authenticate the electronic device 210 and continue to route (269) traffic from the electronic device 210 to respective locations external to the local access network during the second communication session. On the other hand, if the network monitoring server 240 determines that the traffic is anomalous with the usage profile, the network monitoring server 240 may send (271) a notification to the electronic device 210 to re-authenticate the electronic device 210, causing the electronic device 210 to display (273) an authentication portal for receiving a user identifier from the individual. To this end, the network monitoring server 240 can prevent unauthorized electronic devices on-board the vehicle from surreptitiously gaining access to the local access network 105 by spoofing (e.g., MAC spoofing) the electronic device 210.

Turning now to FIG. 3A, depicted is an exemplary interface 300 associated with a user purchasing an access product. The interface 300 may be presented on an electronic device (such as one of the electronic devices 110 or 210). Although FIG. 3A depicts the interface 300 being presented by a smart phone, the interface 300 may be presented by any type of electronic device, such as a tablet, a laptop computer, a personal digital assistant, an e-reader, smart glasses, smart watches, or any other mobile computing device capable of wireless communications. It should be appreciated that FIG. 3A depicts only one exemplary interface and other interfaces may be implemented without departing from the scope of the present disclosure.

The exemplary interface 300 may be presented after an individual carries the electronic device within a local access network (such as the local access network 105) configured to perform the disclosed network authentication techniques and logs into an individual's account by providing a user identifier or credentials. More particularly, the interface 300 may be presented when the user of the electronic device attempts to access a webpage and/or otherwise communicate over the local access network. As depicted, the interface 300 may request that the individual purchase an access product. In the depicted example, the interface 300 presents an option to select among various access products, including a Wi-Fi pass to access one or more applications or websites via the external network (such as the external network 145). The interface 300 may also display a cost corresponding to each available access product.

The interface 300 may be further configured to receive, as user input, a selection of a particular access product. Accordingly, in response to receiving the user input indicating a selection of an access product, the electronic device may transmit a request over the local access network indicating the selected access product. In response, the network may modify parameters of an access profile corresponding to the electronic device in accordance with the selected access product. The access profile may also include or otherwise be associated with the user identifier or credentials (e.g., username and password) received from the individual during login, and/or an identity of the electronic device (e.g., an IMSI, a MEID, an ICCID, a pESN, a MAC address, RSSI, browser ID, or destination URL) received over the local access network. As result, when the electronic device subsequently transmits data over the local access network during a communication session, the local access network can authenticate the electronic device in accordance with the access profile so that the data can be processed by the local access network and further routed to an external network.

Referring to FIG. 3B, depicted is an example access profile 302 associated with an electronic device (such as one of the electronic devices 110 or 210). The access profile 302 may be stored in a database (such as profile database 150). As depicted, the access profile 302 may include parameters corresponding to a device identifier, a user identifier, any purchased access products, and any status (e.g., time remaining in an allowed usage period) of the expiration of the purchased access products.

Referring to FIG. 3C, depicted is an example usage profile 304 associated with an electronic device (such as one of the electronic devices 110 or 210). The usage profile 304 may be stored in a database (such as profile database 150). In some embodiments, the usage profile 304 may be included in the access profile (such as access profile 302). In other embodiments, the usage profile 304 may be separate from the access profile yet associated with the access profile. In such embodiments, the usage profile 304 may include a linking element, such as the device identifier, to associate the usage profile 304 with the access profile. Regardless of embodiment, the usage profile 304 may include one or more usage behavior-based metrics about the applications or websites the electronic device has interacted with while connected to the local access network. As depicted on the usage profile 304, the one or more usage behavior-based metrics may include the number of applications or websites in use during a communication session, an amount of data used by each application or website, or a usage pattern that indicates the order in which applications or websites were accessed according to recorded timestamps. Although not depicted in the usage profile 304, the usage profile 304 may include other usage behavior-based metrics for each application or website, including an amount of data blocked, a current or average latency, a current or average throughput of data, and other similar or related metrics. Further still, although the usage profile 304 only lists five applications and two websites, the usage profile 304 may include usage metrics for any number of applications or websites with which the electronic device has interacted while within the local access network. According to certain aspects, the usage profile 304 may include updated metrics as the electronic device continues to interact within the local access network, either in the same session (e.g., "Session 1") or another session.

Figure 4:
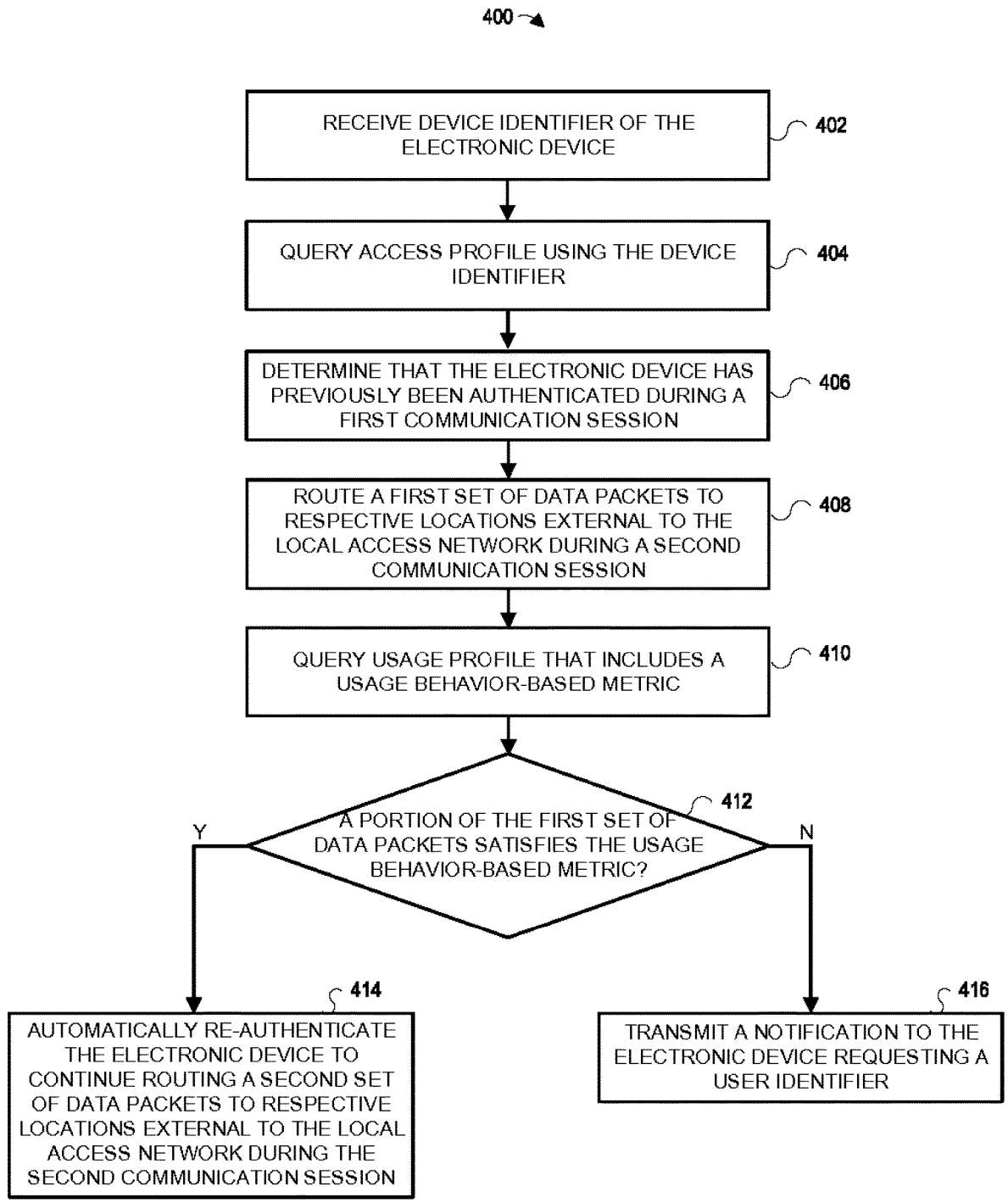
FIG. 4 is an example flow diagram of an example method for performing the re-authentication techniques, which may be implemented in the communication system depicted in FIG. 1.

FIG. 4 depicts an example flow diagram of an example method 400 for performing the usage-based network authentication techniques described herein. The method 400 may be performed by an authentication server (such as one of the authentication servers 120 or 220) in communication with an electronic device (such as one of the electronic devices 110 or 210) over a local access network (such as the local access networks 105). The authentication server may also be interconnected with a network monitoring server (such as one of the network monitoring servers 140 or 240). Both the authentication server and the network monitoring server may be interconnected with a profile database (such as one of the profile databases 150 or 250) storing an access profile assigned to the electronic device.

The method 400 may begin at block 402 when the authentication server receives a device identifier that was transmitted from the electronic device. The electronic device may provide a device identifier, such as an IMSI, a MEID, an ICCID, a pESN, MAC address, RSSI, browser ID, or destination URL to the authentication server upon detecting the local access network.

Using the device identifier, the authentication server at block 404 queries an access profile (such as access profile 302) corresponding to the device identifier, and therefore the electronic device. As discussed above with respect to FIG. 3B, the access profile may include or otherwise be associated with an access product, user identifier or credentials, and/or a device identifier.

Upon querying the access profile, the authentication server at block 406 determines that the electronic device has previously been authenticated during a first communication session. For example, the authentication server may identify that a usage profile (such as usage profile 304) included within or otherwise associated with the access profile of the electronic device exists. The usage profile can indicate that the electronic device has previously been authenticated during a first communication session, and can further indicate a usage behavior-based metric that measures traffic during the first communication session as a result of the individual using the electronic device.

After the authentication server determines that the electronic device has previously been authenticated during a first communication session, the authentication server at block 408 routes a first set of data packets that is destined to respective locations external to the local access network during a second communication session. The first set of data packets can be routed to the network monitoring server for processing prior to transmission to respective locations external to the local access network. In this way, the network monitoring server can monitor the first set of data packets transmitted by the electronic device during the second communication session.

The network monitoring server at block 410 can query the usage profile to determine whether the first set of data packets transmitted by the electronic device is consistent with the usage profile. That is, the network monitoring server at block 412 determines whether the first set of data packets (or at least a portion thereof) satisfies the usage behavior-based metric included in the usage profile. For example, if the usage behavior-based metric indicates that the electronic device utilized network resources corresponding to three particular applications (e.g., Facebook, Instagram, and ESPN), the network monitoring server may determine that the first set of data packets (or at least a portion thereof) satisfies the usage behavior-based metric if the first set of data packets correspond to the three same applications. As another example, if the usage behavior-based metric indicates that the electronic device communicated 50 megabytes of data for each of the three particular applications during the first communication session, the network monitoring server may determine that the first set of data packets (or at least a portion thereof) does not satisfy the usage behavior-based metric if the volume of the first set of data packets corresponding to the three same applications indicates 300 megabytes of data for each application.

If the network monitoring server determines that the first set of data packets (or at least a portion thereof) satisfies the usage behavior-based metric included in the usage profile, the network monitoring server at block 414 automatically re-authenticates the electronic device to continue routing a second set of data packets to respective locations external to the local access network during the second communication session. Otherwise, if the network monitoring server determines that the first set of data packets (or at least a portion thereof) does not satisfy the usage behavior-based metric included in the usage profile, the network monitoring server at block 416 transmits a notification to the electronic device, either directly or indirectly via the authentication server, to request a user identifier from the electronic device to re-authenticate the electronic device.

Figure 5:
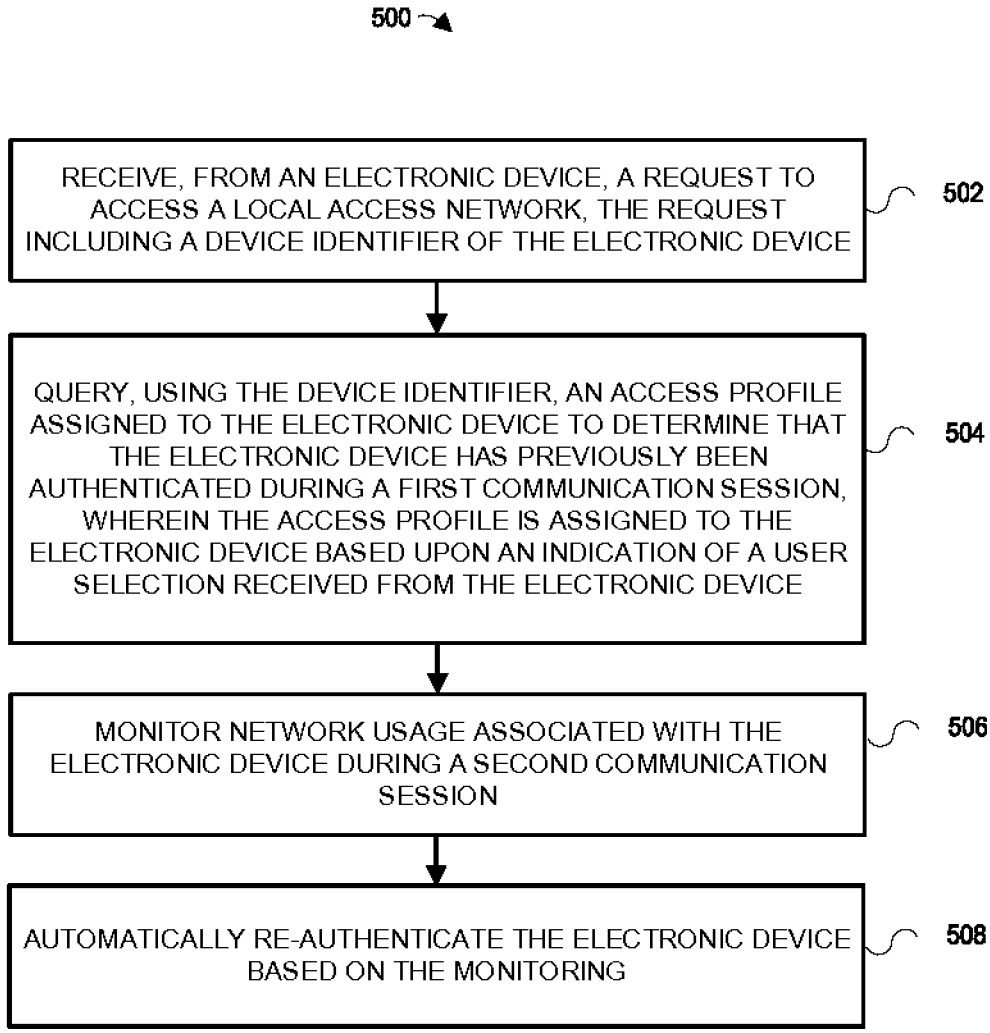
FIG. 5 is an example flow diagram of another example method for performing the re-authentication techniques, which may be implemented in the communication system depicted in FIG. 1.

FIG. 5 depicts an example flow diagram of an example method 500 for performing the usage-based network authentication techniques described herein. In some embodiments, the method 500 may be performed by one server (such as the authentication server 120 or 220) to re-authenticate an electronic device (such as the electronic device 110 or 210). In other embodiments, the method 500 may be performed by a collection of distributively configured servers (such as the authentication server 120 or 220 and the network monitoring servers 140 or 240) to re-authenticate the electronic device.

The method 500 may begin at block 502 when the one or more servers receives, from an electronic device, a request to access a local access network (e.g., events or blocks 259, 402). The request includes a device identifier of the electronic device.

The one or more servers at block 504 then queries, using the device identifier, an access profile assigned to the electronic device to determine that the electronic device has previously been authenticated during a first communication session (e.g., events or blocks 261, 404). The access profile is assigned to the electronic device based upon an indication of a user selection received from the electronic device.

The one or more servers then at block 506 monitors network usage associated with the electronic device during a second communication session (e.g., events or blocks 265, 408, 410, 412).

The one or more servers then at block 508 automatically re-authenticates the electronic device based on the monitoring (e.g., events or blocks 269, 414).

Figure 6:
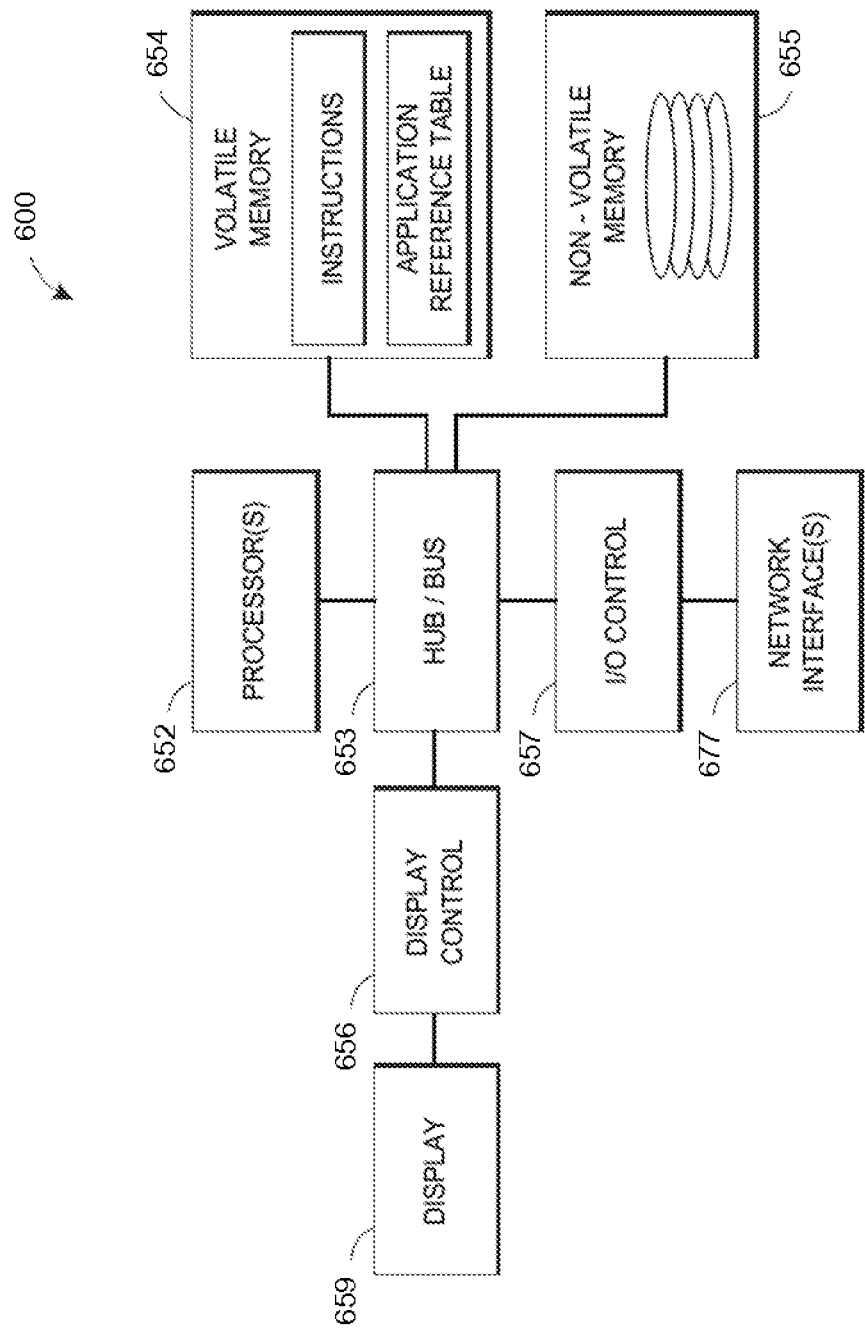
FIG. 6 is a block diagram of a server (e.g., the authentication server 120 of FIG. 1, the network monitoring server 140 of FIG. 1) that facilitates the re-authentication techniques disclosed herein.

FIG. 6 illustrates a block diagram of an example server 600 (such as one of the authentication server 120 or 220 or one of the network monitoring servers 140 or 240) that may be utilized in the local access network 105. The server 600 may include, for example, one more central processing units (CPUs) or processors 652, and one or more busses or hubs 653 that connect the processor(s) 652 to other elements of the server 600, such as a volatile memory 654, a non-volatile memory 655, a display controller 656, and an I/O controller 657. The volatile memory 654 and the non-volatile memory 655 may each include one or more non-transitory, tangible computer readable storage media such as random access memory (RAM), read only memory (ROM), FLASH memory, a hard disk drive, a digital versatile disk (DVD) disk drive, etc.

In an embodiment, the memory 654 and/or the memory 655 may store instructions that are executable by the processor 652. For example, in a server particularly configured to perform the usage-based network authentication techniques described herein, the instructions may be the instructions executed by the server 600. In some embodiments, at least one of the memories 654 and 655 may additionally store an application reference table utilized to correlate header data to an application and a monitoring application to determine whether traffic received from an electronic device is consistent with a usage profile corresponding to the electronic device. Additionally, the bus 653 may interconnect the server 600 with a profile database (not depicted), such as the profile database 150, that stores a plurality of access profiles and usage profiles corresponding to a plurality of electronic devices utilizing the local access network.

The server 600 may also include network interfaces 677 controlled by the I/O control 657. The network interfaces 677 may be any number of antenna, transmitters, receivers, transceivers, etc. specifically configured to transmit or receive data at a particular frequency and/or frequency range. To this end, the instructions may include instructions that, when executed by the processors 652, cause the network interfaces 677 to transmit data over a local communication link and/or an external communication link. Similarly, when the network interfaces 677 receives data, the instructions may include instructions that cause the processors 652 to analyze and/or process the received data.

In some embodiments, the server 600 may also perform any number of actions described herein with respect to an authentication server, such as the authentication server 120, or a network monitoring server, such as network monitoring server 140. In these embodiments, the instructions stored in the memories 654 and 655 may also include instructions to perform the actions described with the respective authentication server and network monitoring server. Any reference to an authentication server being a distinct entity from a network monitoring server is done for ease of explanation, and does not require the implementation of two distinct hardware modules.

The illustrated server 600 is only one example of a server suitable to be particularly configured for use in the local access network 105. Other embodiments of the server 600 may also be particularly configured for use in the local access network 105, even if the other embodiments have additional, fewer, or alternative components than shown in FIG. 6, have one or more combined components, or have a different configuration or arrangement of the components. Moreover, the various components shown in FIG. 6 can be implemented in hardware, a processor executing software instructions, or a combination of both hardware and a processor executing software instructions, including one or more signal processing and/or application specific integrated circuits.

Figure 7:
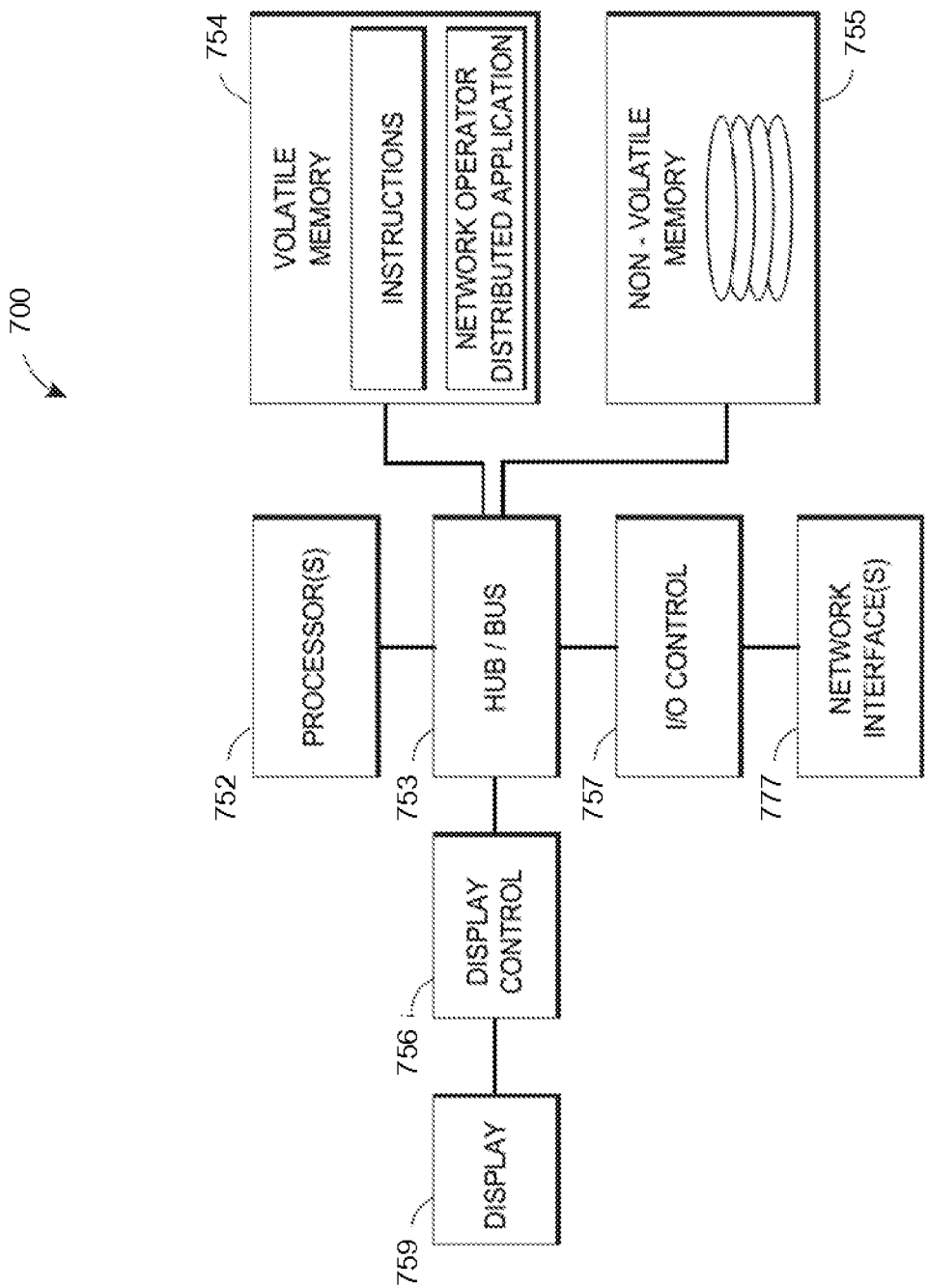
FIG. 7 is a block diagram of an electronic device (e.g., one of the electronic devices 110 of FIG. 1) that facilitates the re-authentication techniques disclosed herein.

FIG. 7 illustrates a block diagram of an electronic device 700 (such as one of the electronic device 110 or 210) that may be utilized in the local access network 105. The electronic device 700 may include, for example, one more central processing units (CPUs) or processors 752, and one or more busses or hubs 753 that connect the processor(s) 752 to other elements of the electronic device 700, such as a volatile memory 754, a non-volatile memory 755, a display controller 756, and an I/O controller 757. The volatile memory 754 and the non-volatile memory 755 may each include one or more non-transitory, tangible computer readable storage media such as random access memory (RAM), read only memory (ROM), FLASH memory, a hard disk drive, a digital versatile disk (DVD) disk drive, etc.

In an embodiment, the memory 754 and/or the memory 755 may store instructions that are executable by the processor 752. For example, in an electronic device particularly configured to perform the usage-based network authentication techniques described herein, the instructions may be the instructions executed by the electronic device 700. In some embodiments, the instructions may include instructions that, when executed by the processors 752, cause at least one of the display control 756 or the I/O control 757 to present the user interfaces described above. In some embodiments, at least one of the memories 1054 and 1055 may additionally store applications (e.g., Internet browser, social media applications, video streaming applications, a network operator distributed application, etc.). The network operator distributed application may include a set of instructions that enables the electronic device 700 to receive notifications from the network operator as well as present the user interfaces described herein.

Additionally, the electronic device 700 may include network interfaces 777 controlled by the I/O control 757. The network interfaces 777 may be any number of antenna, transmitters, receivers, transceivers, etc. specifically configured to transmit or receive data at a particular frequency and/or frequency range. To this end, the instructions may include instructions that, when executed by the processors 752, cause the network interfaces 777 to transmit data over a local communication link. Similarly, when the network interfaces 777 receives data via the local communication link, the instructions may include instructions that cause the processors 752 to analyze and/or process the received data.

The illustrated electronic device 700 is only one example of an electronic device suitable to be particularly configured for use in the local access network 105. Other embodiments of the electronic device 700 may also be particularly configured for use in the local access network 105, even if the other embodiments have additional, fewer, or alternative components than shown in FIG. 7, have one or more combined components, or have a different configuration or arrangement of the components. Moreover, the various components shown in FIG. 7 can be implemented in hardware, a processor executing software instructions, or a combination of both hardware and a processor executing software instructions, including one or more signal processing and/or application specific integrated circuits.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A method for re-authenticating an electronic device, the method comprising: receiving, by one or more processors and from an electronic device, a request to access a local access network on-board a vehicle, the request including a device identifier of the electronic device; querying, by the one or more processors and using the device identifier, an access profile assigned to the electronic device to determine that the electronic device has previously been authenticated during a first communication session, wherein the access profile is assigned to the electronic device based upon an indication of a user selection received from the electronic device; monitoring, by the one or more processors, network usage associated with the electronic device during a second communication session; and automatically re-authenticating, by the one or more processors, the electronic device based on the monitoring.

2. The method of the previous aspect, wherein monitoring network usage comprises: routing, by the one or more processors and from the electronic device, a first set of data packets to respective locations external to the local access network during the second communication session in accordance with the access profile; querying, by the one or more processors, a usage profile assigned to the electronic device, wherein the usage profile includes a usage behavior-based metric based upon monitoring traffic received from the electronic device during the first communication session; determining, by the one or more processors, whether at least a portion of the first set of data packets satisfies the usage behavior-based metric indicated in the usage profile; when the at least the portion of the first set of data packets satisfies the usage behavior-based metric, routing, by the one or more processors, a second set of data packets to respective locations external to the local access network during the second communication session; and when the at least the portion of the plurality of data packets does not satisfy the usage behavior-based metric, transmitting, by the one or more processors, a notification to the electronic device requesting a user identifier to re-authenticate the electronic device.

3. The method of any combination of the preceding aspects, further comprising: receiving, by the one or more processors and from the electronic device, the user identifier; querying, by the one or more processors and using the device identifier, the access profile assigned to the electronic device to determine that an indication of the user identifier exists in the access profile; and in response to the querying, re-authenticating, by the one or more processors, the electronic device to access the local access network using the user identifier.

4. The method of any combination of the preceding aspects, wherein monitoring the traffic received from the electronic device comprises: identifying, by the one or more processors, that the traffic supports one or more applications or respective ports or application categories during the first communication session; and calculating, by the one or more processors, the usage behavior-based metric based on a number of the identified one or more applications or respective ports or application categories during the first communication session.

5. The method of any combination of the preceding aspects, wherein determining whether at least the portion of the first set of data packets satisfies the usage behavior-based metric indicated in the usage profile comprises: identifying, by the one or more processors, that the first set of data packets supports one or more applications or respective ports or application categories during the second communication session; calculating, by the one or more processors, a session metric based on a number of the identified one or more applications or respective ports or application categories during the second communication session; comparing, by the one or more processors, the session metric to the usage behavior-based metric; and determining, by the one or more processors, that the portion of the first set of data packets satisfies the usage behavior-based metric based on the comparing.

6. The method of any combination of the preceding aspects, wherein monitoring the traffic received from the electronic device further comprises: separating, by the one or more processors, the traffic into individual data streams corresponding to each of the one or more applications or respective ports or application categories; calculating, by the one or more processors, a respective payload of the individual data streams; and calculating, by the one or more processors, the usage behavior-based metric based on the respective payload of the individual data streams.

7. The method of any combination of the preceding aspects, wherein determining whether at least the portion of the first set of data packets satisfies the usage behavior-based metric indicated in the usage profile comprises: separating, by the one or more processors, the first set of data packets into a first set of individual data streams corresponding to each of the one or more applications or respective ports or application categories; calculating, by the one or more processors, a respective payload of the first set of individual data streams; calculating, by the one or more processors, a session metric based on the respective payload of the first set of individual data streams; comparing, by the one or more processors, the session metric to the usage behavior-based metric; and determining, by the one or more processors, that the portion of the first set of data packets satisfies the usage behavior-based metric based on the comparing.

8. The method of any combination of the preceding aspects, further comprising: updating, by the one or more processors, the usage behavior-based metric based on at least one of the portion of the first set of data packets or the second set of data packets upon determining that the at least the portion of the first set of data packets satisfies the usage behavior-based metric indicated in the usage profile.

9. The method of any combination of the preceding aspects, wherein the device identifier comprises at least one of an international mobile subscriber identity (IMSI), a mobile equipment identifier (MEID), an integrated circuit card identifier (ICCID), a pseudo electronic serial number (pESN), a media access control (MAC) address, a strength of a wireless signal from an access point within the local access network as measured by the electronic device, a browser identifier, a destination uniform resource locator (URL), a service set identifier (SSID), or data related to the vehicle.

10. The method of any combination of the preceding aspects, wherein monitoring the network usage associated with the electronic device during the second communication session is based on at least monitoring one of: one or more websites requested by the electronic device; one or more applications in use by the electronic device; one or more categories corresponding to the one or more applications; one or more ports in use corresponding to the one or more applications; payload corresponding to the one or more websites, the one or more applications, or the one or more ports; or a usage pattern of the one or more websites, the one or more applications, or the one or more ports in use by the electronic device.

11. A system for re-authenticating an electronic device, the system comprising: one or more processors; a profile database storing an access profile corresponding to an electronic device; and one or more non-transitory, computer-readable storage media storing computer-executable instructions that, when executed by the one or more processors, cause the system to: receive, from an electronic device, a request to access a local access network on-board a vehicle, the request including a device identifier of the electronic device; query, using the device identifier, the access profile assigned to the electronic device to determine that the electronic device has previously been authenticated during a first communication session, wherein the access profile is assigned to the electronic device based upon an indication of a user selection received from the electronic device; monitor network usage associated with the electronic device during a second communication session; and automatically re-authenticate the electronic device based on the monitoring.

12. The system of the preceding aspect, wherein to monitor the traffic, the computer-executable instructions, when executed by the one or more processors, further cause the system to: route, from the electronic device, a first set of data packets to respective locations external to the local access network during the second communication session in accordance with the access profile; query a usage profile assigned to the electronic device, wherein the usage profile includes a usage behavior-based metric based upon monitoring traffic received from the electronic device during the first communication session; determine whether at least a portion of the first set of data packets satisfies the usage behavior-based metric indicated in the usage profile; when the at least the portion of the first set of data packets satisfies the usage behavior-based metric, route a second set of data packets to respective locations external to the local access network during the second communication session; and when the at least the portion of the plurality of data packets does not satisfy the usage behavior-based metric, transmit a notification to the electronic device requesting a user identifier to re-authenticate the electronic device.

13. The system of any combination of the preceding aspects, wherein the computer-executable instructions, when executed by the one or more processors, further cause the system to: receive, from the electronic device, the user identifier; query, using the device identifier, the access profile assigned to the electronic device to determine that an indication of the user identifier exists in the access profile; and in response to the querying, re-authenticate the electronic device to access the local access network using the user identifier.

14. The system of any combination of the preceding aspects, wherein to monitor the traffic received from the electronic device, the computer-executable instructions, when executed by the one or more processors, further cause the system to: identify that the traffic supports one or more applications or respective ports or application categories during the first communication session; and calculate the usage behavior-based metric based on a number of the identified one or more applications or respective ports or application categories during the first communication session.

15. The system of any combination of the preceding aspects, wherein to determine whether the at least the portion of the first set of data packets satisfies the usage behavior-based metric indicated in the usage profile, the computer-executable instructions, when executed by the one or more processors, further cause the system to: identify that the first set of data packets supports one or more applications or respective ports or application categories during the second communication session; calculate a session metric based on a number of the identified one or more applications or respective ports or application categories during the second communication session; compare the session metric to the usage behavior-based metric; and determine that the portion of the first set of data packets satisfies the usage behavior-based metric based on the comparing.

16. The system of any combination of the preceding aspects, wherein to monitor the traffic received from the electronic device, the computer-executable instructions, when executed by the one or more processors, further cause the system to: separate the traffic into individual data streams corresponding to each of the one or more applications or respective ports or application categories; calculate a respective payload of the individual data streams; and calculate the usage behavior-based metric based on the respective payload of the individual data streams.

17. The system of any combination of the preceding aspects, wherein to determine whether the at least the portion of the first set of data packets satisfies the usage behavior-based metric indicated in the usage profile, the computer-executable instructions, when executed by the one or more processors, further cause the system to: separate the first set of data packets into a first set of individual data streams corresponding to each of the one or more applications or respective ports or application categories; calculate a respective payload of the first set of individual data streams; calculate a session metric based on the respective payload of the first set of individual data streams; compare the session metric to the usage behavior-based metric; and determine that the portion of the first set of data packets satisfies the usage behavior-based metric based on the comparing.

18. The system of any combination of the preceding aspects, wherein the computer-executable instructions, when executed by the one or more processors, further cause the system to: update the usage behavior-based metric based on at least one of the portion of the first set of data packets or the second set of data packets upon determining that the at least the portion of the first set of data packets satisfies the usage behavior-based metric indicated in the usage profile.

19. The system of any combination of the preceding aspects, wherein the device identifier comprises at least one of an international mobile subscriber identity (IMSI), a mobile equipment identifier (MEID), an integrated circuit card identifier (ICCID), a pseudo electronic serial number (pESN), a media access control (MAC) address, a strength of a wireless signal from an access point within the local access network as measured by the electronic device, a browser identifier, a destination uniform resource locator (URL), a service set identifier (SSID), or data related to the vehicle.

20. The system of any combination of the preceding aspects, wherein to monitor the network usage associated with the electronic device during the second communication session, the computer-executable instructions, when executed by the one or more processors, further cause the system to monitor at least one of: one or more websites requested by the electronic device; one or more applications in use by the electronic device; one or more categories corresponding to the one or more applications; one or more ports in use corresponding to the one or more applications; payload corresponding to the one or more websites, the one or more applications, or the one or more ports; or a usage pattern of the one or more websites, the one or more applications, or the one or more ports in use by the electronic device.

What is claimed is:

1. A method for re-authenticating an electronic device, the method comprising:
   receiving, by one or more processors and from an electronic device, a request to access a local access network on-board a vehicle, the request including a device identifier of the electronic device;
   querying, by the one or more processors and using the device identifier, an access profile assigned to the electronic device to determine that the electronic device has previously been authenticated during a first communication session, wherein the access profile is assigned to the electronic device based upon an indication of a user selection received from the electronic device;
   monitoring, by the one or more processors, network usage associated with the electronic device during a second communication session, wherein monitoring network usage comprises:
      routing, by the one or more processors and from the electronic device, a first set of data packets to respective locations external to the local access network during the second communication session in accordance with the access profile, and
      querying, by the one or more processors, a usage profile assigned to the electronic device, wherein the usage profile includes a usage behavior-based metric based upon monitoring traffic received from the electronic device during the first communication session; and
   automatically re-authenticating, by the one or more processors, the electronic device based on the monitoring via determining, by the one or more processors, whether at least a portion of the first set of data packets satisfies the usage behavior-based metric indicated in the usage profile.

2. The method of claim 1, wherein monitoring network usage further comprises:
   when the at least the portion of the first set of data packets satisfies the usage behavior-based metric, routing, by the one or more processors, a second set of data packets to respective locations external to the local access network during the second communication session; and
   when the at least the portion of the plurality of data packets does not satisfy the usage behavior-based metric, transmitting, by the one or more processors, a notification to the electronic device requesting a user identifier to re-authenticate the electronic device.

3. The method of claim 2, further comprising:
   receiving, by the one or more processors and from the electronic device, the user identifier;
   querying, by the one or more processors and using the device identifier, the access profile assigned to the electronic device to determine that an indication of the user identifier exists in the access profile; and
   in response to the querying, re-authenticating, by the one or more processors, the electronic device to access the local access network using the user identifier.

4. The method of claim 1, wherein monitoring the traffic received from the electronic device comprises:
   identifying, by the one or more processors, that the traffic supports one or more applications or respective ports or application categories during the first communication session; and
   calculating, by the one or more processors, the usage behavior-based metric based on a number of the identified one or more applications or respective ports or application categories during the first communication session.

5. The method of claim 4, wherein determining whether at least the portion of the first set of data packets satisfies the usage behavior-based metric indicated in the usage profile comprises:
   identifying, by the one or more processors, that the first set of data packets supports one or more applications or respective ports or application categories during the second communication session;
   calculating, by the one or more processors, a session metric based on a number of the identified one or more applications or respective ports or application categories during the second communication session;
   comparing, by the one or more processors, the session metric to the usage behavior-based metric; and
   determining, by the one or more processors, that the portion of the first set of data packets satisfies the usage behavior-based metric based on the comparing.

6. The method of claim 1, wherein monitoring the traffic received from the electronic device further comprises:
   separating, by the one or more processors, the traffic into individual data streams corresponding to each of the one or more applications or respective ports or application categories;
   calculating, by the one or more processors, a respective payload of the individual data streams; and
   calculating, by the one or more processors, the usage behavior-based metric based on the respective payload of the individual data streams.

7. The method of claim 6, wherein determining whether at least the portion of the first set of data packets satisfies the usage behavior-based metric indicated in the usage profile comprises:
   separating, by the one or more processors, the first set of data packets into a first set of individual data streams corresponding to each of the one or more applications or respective ports or application categories;
   calculating, by the one or more processors, a respective payload of the first set of individual data streams;
   calculating, by the one or more processors, a session metric based on the respective payload of the first set of individual data streams;
   comparing, by the one or more processors, the session metric to the usage behavior-based metric; and
   determining, by the one or more processors, that the portion of the first set of data packets satisfies the usage behavior-based metric based on the comparing.

8. The method of claim 2, further comprising:
   updating, by the one or more processors, the usage behavior-based metric based on at least one of the portion of the first set of data packets or the second set of data packets upon determining that the at least the portion of the first set of data packets satisfies the usage behavior-based metric indicated in the usage profile.

9. The method of claim 1, wherein the device identifier comprises at least one of an international mobile subscriber identity (IMSI), a mobile equipment identifier (MEID), an integrated circuit card identifier (ICCID), a pseudo electronic serial number (pESN), a media access control (MAC) address, a strength of a wireless signal from an access point within the local access network as measured by the electronic device, a browser identifier, a destination uniform resource locator (URL), a service set identifier (SSID), or data related to the vehicle.

10. The method of claim 1, wherein monitoring the network usage associated with the electronic device during the second communication session is based on at least monitoring one of:
one or more websites requested by the electronic device;
one or more applications in use by the electronic device;
one or more categories corresponding to the one or more applications;
one or more ports in use corresponding to the one or more applications;
payload corresponding to the one or more websites, the one or more applications, or the one or more ports; or
a usage pattern of the one or more websites, the one or more applications, or the one or more ports in use by the electronic device.

11. A system for re-authenticating an electronic device, the system comprising:
one or more processors;
a profile database storing an access profile corresponding to an electronic device; and
one or more non-transitory, computer-readable storage media storing computer-executable instructions that, when executed by the one or more processors, cause the system to:
receive, from an electronic device, a request to access a local access network on-board a vehicle, the request including a device identifier of the electronic device;
query, using the device identifier, the access profile assigned to the electronic device to determine that the electronic device has previously been authenticated during a first communication session, wherein the access profile is assigned to the electronic device based upon an indication of a user selection received from the electronic device;
monitor network usage associated with the electronic device during a second communication session, wherein to monitor the traffic, the computer-executable instructions, when executed by the one or more processors, further cause the system to:
route, from the electronic device, a first set of data packets to respective locations external to the local access network during the second communication session in accordance with the access profile, and
query a usage profile assigned to the electronic device, wherein the usage profile includes a usage behavior-based metric based upon monitoring traffic received from the electronic device during the first communication session; and
automatically re-authenticate the electronic device based on the monitoring via determining whether at least a portion of the first set of data packets satisfies the usage behavior-based metric indicated in the usage profile.

12. The system of claim 11, wherein to monitor the traffic, the computer-executable instructions, when executed by the one or more processors, further cause the system to:
when the at least the portion of the first set of data packets satisfies the usage behavior-based metric, route a second set of data packets to respective locations external to the local access network during the second communication session; and
when the at least the portion of the plurality of data packets does not satisfy the usage behavior-based metric, transmit a notification to the electronic device requesting a user identifier to re-authenticate the electronic device.

13. The system of claim 12, wherein the computer-executable instructions, when executed by the one or more processors, further cause the system to:
receive, from the electronic device, the user identifier;
query, using the device identifier, the access profile assigned to the electronic device to determine that an indication of the user identifier exists in the access profile; and
in response to the querying, re-authenticate the electronic device to access the local access network using the user identifier.

14. The system of claim 11, wherein to monitor the traffic received from the electronic device, the computer-executable instructions, when executed by the one or more processors, further cause the system to:
identify that the traffic supports one or more applications or respective ports or application categories during the first communication session; and
calculate the usage behavior-based metric based on a number of the identified one or more applications or respective ports or application categories during the first communication session.

15. The system of claim 14, wherein to determine whether the at least the portion of the first set of data packets satisfies the usage behavior-based metric indicated in the usage profile, the computer-executable instructions, when executed by the one or more processors, further cause the system to:
identify that the first set of data packets supports one or more applications or respective ports or application categories during the second communication session;
calculate a session metric based on a number of the identified one or more applications or respective ports or application categories during the second communication session;
compare the session metric to the usage behavior-based metric; and
determine that the portion of the first set of data packets satisfies the usage behavior-based metric based on the comparing.

16. The system of claim 11, wherein to monitor the traffic received from the electronic device, the computer-executable instructions, when executed by the one or more processors, further cause the system to:
separate the traffic into individual data streams corresponding to each of the one or more applications or respective ports or application categories;
calculate a respective payload of the individual data streams; and
calculate the usage behavior-based metric based on the respective payload of the individual data streams.

17. The system of claim 16, wherein to determine whether the at least the portion of the first set of data packets satisfies the usage behavior-based metric indicated in the usage profile, the computer-executable instructions, when executed by the one or more processors, further cause the system to:
separate the first set of data packets into a first set of individual data streams corresponding to each of the one or more applications or respective ports or application categories;
calculate a respective payload of the first set of individual data streams;

calculate a session metric based on the respective payload of the first set of individual data streams;

compare the session metric to the usage behavior-based metric; and determine that the portion of the first set of data packets satisfies the usage behavior-based metric based on the comparing.

18. The system of claim 12, wherein the computer-executable instructions, when executed by the one or more processors, further cause the system to:

update the usage behavior-based metric based on at least one of the portion of the first set of data packets or the second set of data packets upon determining that the at least the portion of the first set of data packets satisfies the usage behavior-based metric indicated in the usage profile.

19. The system of claim 11, wherein the device identifier comprises at least one of an international mobile subscriber identity (IMSI), a mobile equipment identifier (MEID), an integrated circuit card identifier (ICCID), a pseudo electronic serial number (pESN), a media access control (MAC) address, a strength of a wireless signal from an access point within the local access network as measured by the electronic device, a browser identifier, a destination uniform resource locator (URL), a service set identifier (SSID), or data related to the vehicle.

20. The system of claim 11, wherein to monitor the network usage associated with the electronic device during the second communication session, the computer-executable instructions, when executed by the one or more processors, further cause the system to monitor at least one of:

one or more websites requested by the electronic device;

one or more applications in use by the electronic device;

one or more categories corresponding to the one or more applications;

one or more ports in use corresponding to the one or more applications;

payload corresponding to the one or more websites, the one or more applications, or the one or more ports; or a usage pattern of the one or more websites, the one or more applications, or the one or more ports in use by the electronic device.

* * * * *